United States Patent [19]

Admiraal

[11] Patent Number: 5,279,348
[45] Date of Patent: Jan. 18, 1994

[54] METHOD AND APPARATUS FOR STRAIGHTENING A RIM OF A SPOKE WHEEL

[75] Inventor: Anthonius S. Admiraal, Limmen, Netherlands

[73] Assignee: Holland Mechanics B.V., Netherlands

[21] Appl. No.: 760,108

[22] Filed: Sep. 16, 1991

[30] Foreign Application Priority Data

Sep. 18, 1990 [NL] Netherlands .................. 9002058

[51] Int. Cl.⁵ ........................ B60B 1/04; B21K 1/34
[52] U.S. Cl. .................................................. 157/1.5
[58] Field of Search .................... 157/1.5, 1.55; 29/894.33, 894.333

[56] References Cited

U.S. PATENT DOCUMENTS

| | | | |
|---|---|---|---|
| 2,633,907 | 4/1953 | Douglas | 157/1.5 |
| 3,024,834 | 3/1962 | Mennesson | 157/1.5 |
| 3,507,027 | 4/1970 | Jaulmes | 29/894.33 |
| 4,045,852 | 9/1977 | Winch | 157/1.5 X |
| 4,585,046 | 4/1986 | Buckley | 157/1.55 |

FOREIGN PATENT DOCUMENTS 379417  8/1973  U.S.S.R. .................. 157/1.5

*Primary Examiner*—D. S. Meislin
*Attorney, Agent, or Firm*—Wolf, Greenfield & Sacks

[57] ABSTRACT

In a method of straightening a rim of a spoke wheel by tensioning and/or releasing the various spokes and measuring a radial and/or axial misalignment of the rim around the circumference thereof, all spokes are tensioned in a first run such that the tension therein is brought between a predetermined minimum and maximum value. If required, several runs take place and in each following run, based on the measured radial and/or axial misalignment of the rim, the tension in certain spokes is altered between said minimum and maximum value to correct the misalignment, such that the maximum value is increased at the start of each following run. An apparatus for carrying out this method is also disclosed.

8 Claims, 4 Drawing Sheets

METHOD AND APPARATUS FOR STRAIGHTENING A RIM OF A SPOKE WHEEL

The invention relates to a method of straightening a rim of a spoke wheel by tensioning and/or releasing the various spokes and measuring a radial and/or axial misalignment of the rim around the circumference thereof, wherein all spokes are tensioned in a first run such that the tension therein is brought between a predetermined minimum and maximum value.

Such a method is known from Dutch patent No. 183.711 corresponding U.S. Pat. No. 4,126,942. In this method nipples that are screwed on the spokes are tightened or loosened by a nipple key for increasing or decreasing the spoke tension dependent on the desired direction of displacement of the rim in order to eliminate the misalignment thereof. The number of revolutions of the nipple key for tightening or loosening is controlled by the measurement of the misalignment and the required displacement following from it and the drive of the nipple key incorporating a torque limitor in order to prevent the threads of the nipples and spokes from being overloaded. When there is a misalignment in the rim, this known apparatus causes, prior to tightening a spoke for eliminating this misalignment, the loosening of the other spoke in a pair thereof in order to prevent the occurrence of overload. This alternate loosening and tightening costs a lot of time and, as a result thereof, the forces are not distributed evenly over all spokes after the adjustment of the nipples. As a consequence thereof it is possible that some spokes are overloaded earlier than other ones, causing the development of deformations and deviations in the shape of the wheel.

The object of the present invention is to provide a method of the type mentioned in the preamble, with which the disadvantage is removed in an effective way.

For this purpose the method according to the invention is characterized in that several runs take place, if required, and in each following run, based on the measured radial and/or axial misalignment of the rim, the tension in certain spokes is altered between said minimum and maximum value to correct the misalignment, such that the maximum value is increased at a start of each following run.

Due to this measurement the spokes are tensioned much more uniformly since in each run the tension therein is limited to a selected low maximum value. When the maximum value of the tension in a spoke is reached and a sufficient correction of the rim misalignment is not yet obtained, there is nevertheless a change to the next spoke and only in a following run the tension in this spoke is possibly increased. As a result thereof, the variation in the tensions of the various spokes is limited to a minimum which contributes to the quality of the wheel.

The invention also includes an apparatus for straightening a rim of a spoke wheel by tensioning and/or releasing the various spokes, comprising a hub support for supporting the hub of the spoke wheel, drive means for rotating the spoke wheel about its axis, at least one nipple key for rotating nipples with which the spokes are tensioned between the hub and the rim, a drive for said nipple key, measuring means for measuring a radial and/or axial misalignment of the rim, and control means for controlling the nipple key dependent on the radial and/or axial misalignment as measured. The drive of the nipple key comprises means for limiting the maximum tension in the spokes and means for automatically increasing the maximum value of the spoke tension stepwise during the straightening operation.

In a simple embodiment of the means for limiting the spoke tension it consists of an adjustable slip coupling.

A more accurate limitation of the spoke tension can be obtained when said means comprises a measuring device adapted to be brought into engagement with a spoke and to measure the tension therein and compare it with the set maximum value of the tension.

Due to this direct measurement of the spoke tension, the influence of the strongly fluctuating friction between the threads of the nipple and spoke, as may occur in the first embodiment, is avoided. A method of direct measurement of the tension in the spoke is the so-called three-point-measurement, in which in the center between two fixed points there is exerted a force perpendicular to the spoke, the occurring deflection of the spoke being measured and the spoke tension can be derived therefrom.

A further improvement of the apparatus can be obtained when it comprises a control program for determining at each time the rotation of the nipple key as a function of the desired displacement of the rim in order to correct a misalignment and as function of the tensions in the spokes.

As a result it is possible to process the measuring data in the control program which allows the analysis of the influence of the tension in the spokes on the displacement of the rim.

If the wheel geometry is also taken into account, an even better accuracy can be obtained.

In one embodiment the apparatus according to the invention comprises a measuring device for determining the diameter of the spoke wheel and one or more sensors for determining the spoke spacing and/or the number of spokes within the spoke wheel.

Due to these features the apparatus may be automatically adjusted to different types of wheels.

In order to obtain improved accuracy in the measurement of the tension in the spoke and to reduce the risk of deformation as much as possible, it is favourable to move the nipple key in longitudinal direction of the spoke when it is slid onto the nipple. For this purpose the nipple key may comprise a measuring device for measuring the deviation of the squareness of one of the spokes and the nipple key engaging the respective nipple thereof, as well as an adjusting means to position the nipple key square to this spoke.

In this case it is an additional advantage when the nipple key includes displacement means for sliding the nipple key substantially parallel to the respective spoke onto the corresponding nipple, eliminating the influence on the axial misalignment measurement as a result of the engagement of the nipple key.

The invention will hereafter be elucidated with reference to the drawing showing an embodiment of the apparatus according to the invention by way of example in a very schematic and fragmentary manner.

Figure 1:
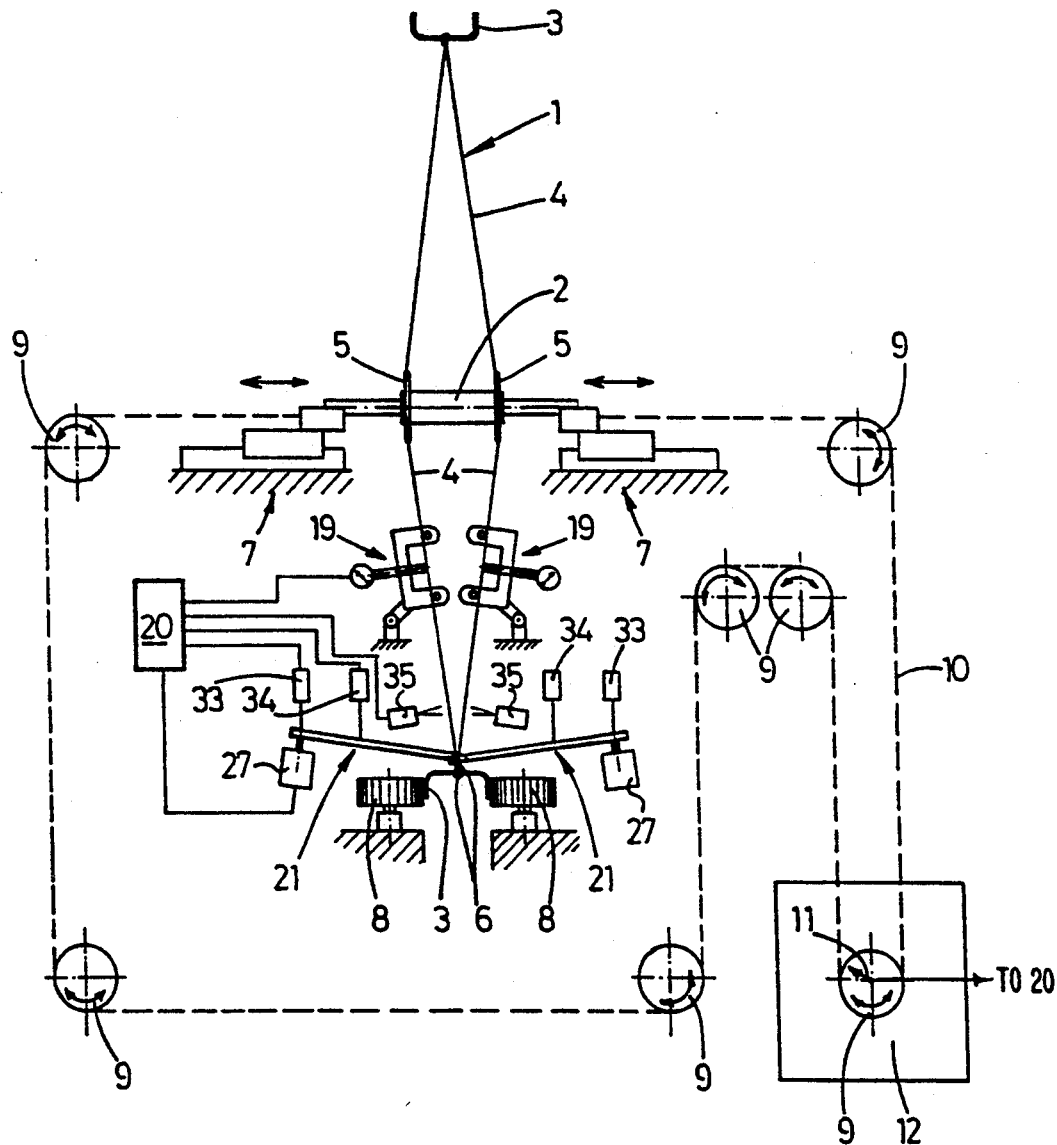
FIG. 1 shows schematically an embodiment of the apparatus according to the invention in cross-section.
Figure 2:
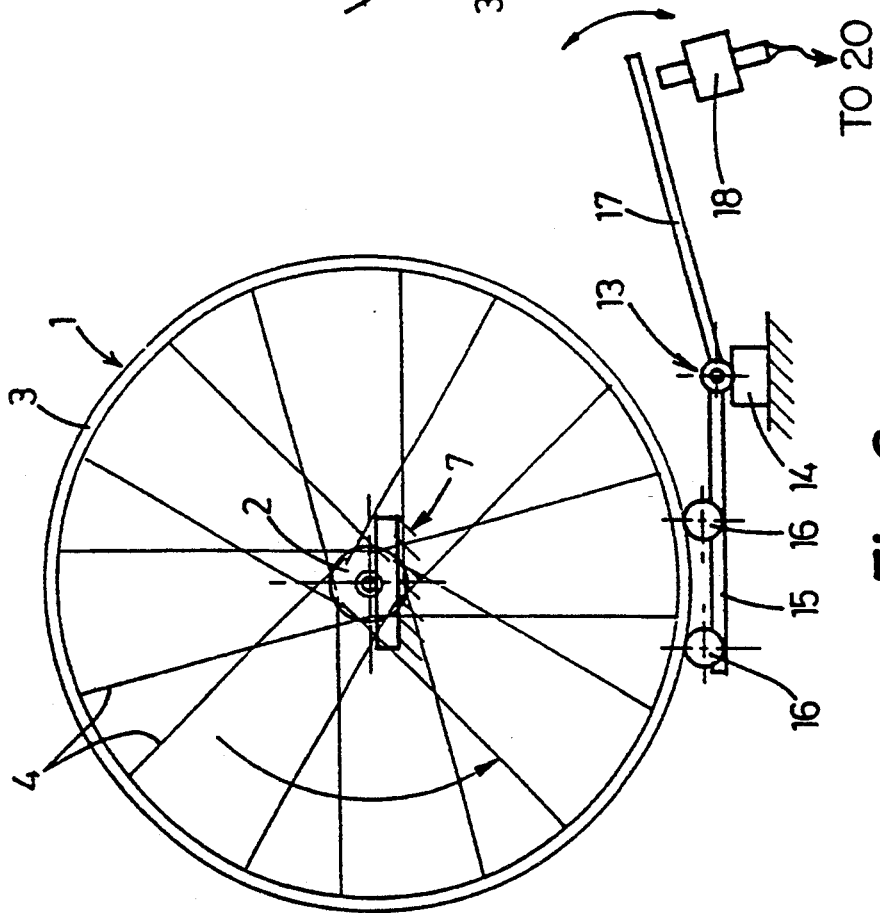
FIG. 2 shows a spoke wheel mounted within the apparatus according to the invention, which includes means for measuring the radial misalignment of the rim thereof.

With reference to the drawings, and in particular to FIGS. 1 and 2, there is shown schematically an apparatus for straightening a spoke wheel 1. The spoke wheel 1 comprises a hub 2, a rim 3 positioned concentrically about the hub 2, and spokes 4 connecting the hub 2 and the rim 3 and being inserted through flanges 5 of the hub 2 and being tensioned by nipples 6 between the rim 3 and the hub 2.

The apparatus includes a hub support ring 7 for supporting the shaft of the hub 2 of the spoke wheel 1. The hub support 7 is freely slidable in a direction transverse to the spoke wheel 1 in order to be able to follow movements of the hub 2 transverse to the wheel 1 during the rotation of the spoke wheel 1. These hub movements will occur when the rim 3 of the spoke wheel 1 has an axial misalignment. The rim itself has its lower point clamped in axial direction by means of drive rollers 8 clamping the rim tightly in between during the rotation, thereof. Through a cord 10, which is passed around guide wheels 9 and is connected to the moving part of the hub support 7, the movement of the hub 2 is transmitted to a digital axial misalignment meter 11. A weight 12 suspended from the guide wheel 9 of the cord 10 tensions the cord independent of the dimension of the hub 2. For further details in relation to this axial alignment measurement the reader is referred to Dutch patent 183.711 of applicant which is incorporated herein by reference thereto.

FIG. 2 further shows schematically the measuring means for measuring the radial misalignment of the rim 3 of the spoke wheel 1. The measuring means consist of a two-armed lever 13 which is pivotally mounted on a stationary support 14, one arm 15 thereof being provided with rollers 16 adapted to roll over the rim 3, and the other arm 17 of which cooperates with an analogue distance measuring sensor 18 to measure the variation in distance between the axis of the hub 2 and the outer edge of the rim 3.

Returning to FIG. 1, there are shown measuring means 19 adapted to measure each time the tension in two different spokes 4. This measurement occurs directly on the spoke 4 by means of a so-called three-point-measurement, in which there is exerted a force in the center between two fixed points of the measuring means 19 in a direction perpendicular to the spoke 4 and the deflection of the spoke 4 resulting therefrom is measured at a position of the point of engagement of the force. From this, the tension in the spoke may be derived.

The spoke tension as measured may be transmitted to central control means 20 and may be compared with a set maximum tension in order to limit the spoke tension during the wheel straightening operation. The control means 20 are permitted to process the several measuring data of the spoke wheel 1 and to transmit control signals to two nipple keys 21 by means of a control program, as will be elucidated further on.

Figure 4:
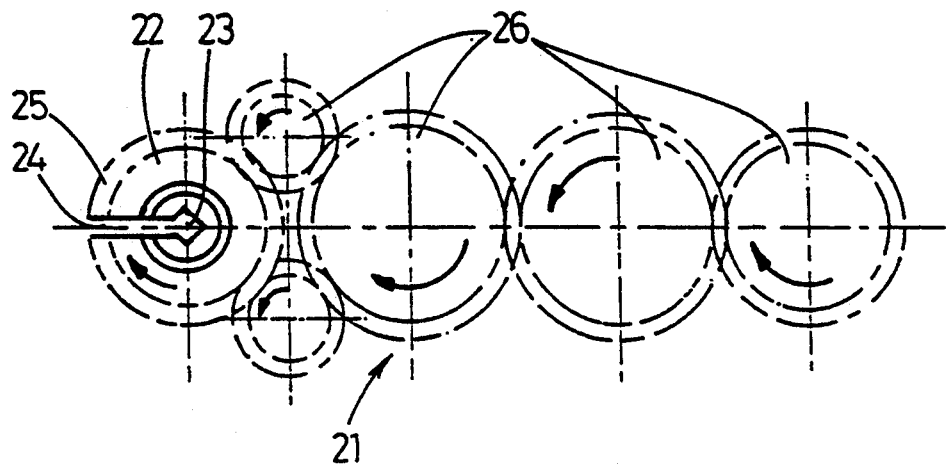
FIGS. 3 and 4 show in schematic side-view and plan-view respectively a nipple key of the apparatus according to the invention.
Figure 3:
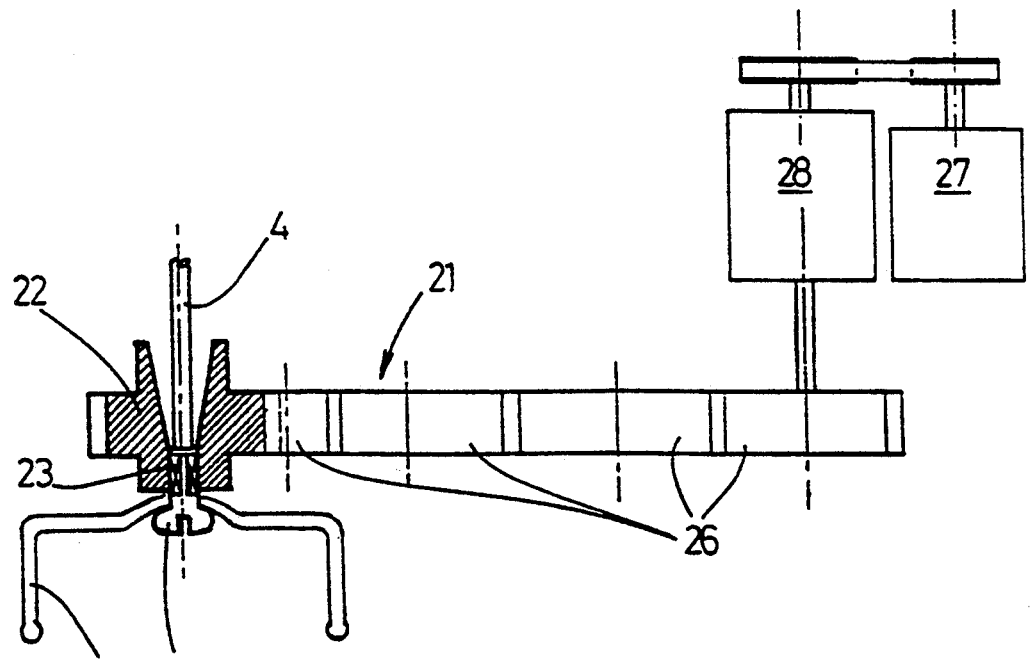

The nipple keys 21 are intended to turn the nipples 6 of the spokes 4 with which any radial and/or axial misalignment in the rim 3 of the spoke wheel 1 may be corrected. FIG. 3 and 4 show in more detail one of the nipple keys 21. It can be seen that the nipple key 21 comprises a key part 22 having a nipple hole 23 and a spoke passage 24. The key part 22 has an outer toothing 25 being in engagement with a gear transmission 26 which is drivable by a motor 27. Further it can be seen in FIG. 3 that a torque limitor 28 in the form of a slip coupling is included which limits the tightening torque which is necessary to tighten the nipple 6. This method allows a limitation of the tension in the respective spoke 4 without necessitating the measuring means 19.

The operation of the apparatus as described is as follows.

During a first revolution of the spoke wheel 1 all spokes 4 are subsequently brought to a tension which is in a range between predetermined minimum and maximum values. This is obtained by means of the slip coupling 28 and the drive of the nipple keys 21, in which a relationship between the spoke tension and the torque on the nipples of the spokes is assumed. Of course it is also possible to use the measuring means 19 to determine whether a minimum or maximum value of the spoke tension is obtained. In this first "tightening run" the minimum and maximum values of the tension are close together. Tightening torques of 0,70 and 0,85 Nm as minimum and maximum, respectively, are for example conceivable. In this run the radial and/or axial misalignment measurement on the rim 3 is already taken into account.

Prior to a next run, which is necessary if the spoke wheel is not yet properly straightened, the maximum tightening torque is increased, for example to 1,10 Nm. Then, depending on the measured radial and/or axial misalignment nipples of certain spokes are rotated wherein the tightening torque cannot exceed the new maximum value or come below the fixed constant minimum value. If the measured radial and/or axial misalignment sill does not meet the requirements, a further correction can take place in a subsequent number of runs with a stepwise increase of the maximum value of the tightening torque of for instance 0,10 Nm until the spoke wheel is properly straightened or the maximally admissible torque is reached, in which case the wheel is rejected. The described method prevents an unnecessary large variation in the spoke tension of the various spokes 4.

Figure 5A:
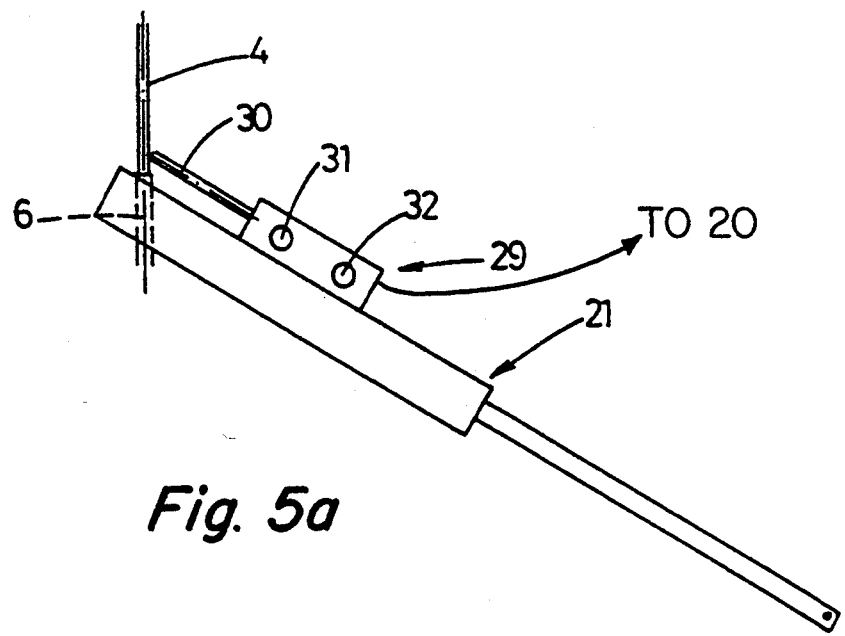
FIGS. 5a-5c show means for adjusting the squareness of the nipple key of FIGS. 3 and 4 to a spoke.
Figure 5B:
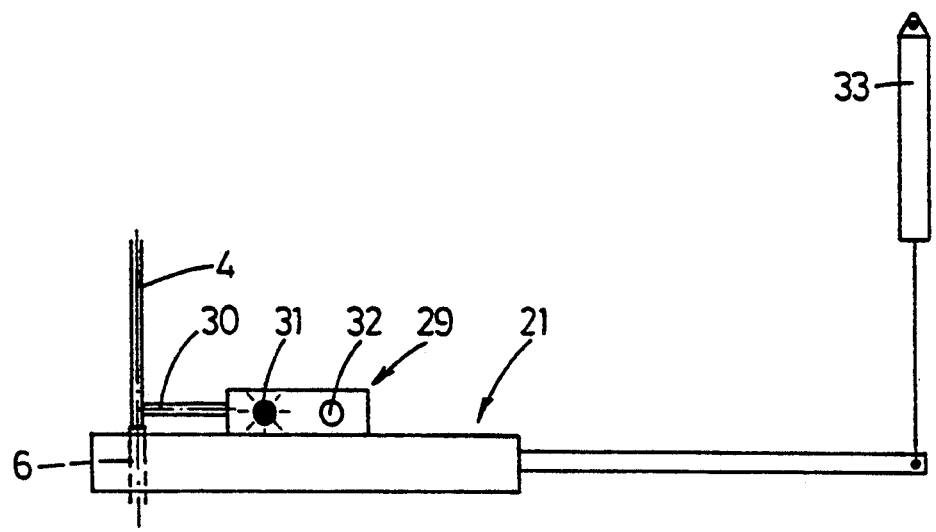
Figure 5C:
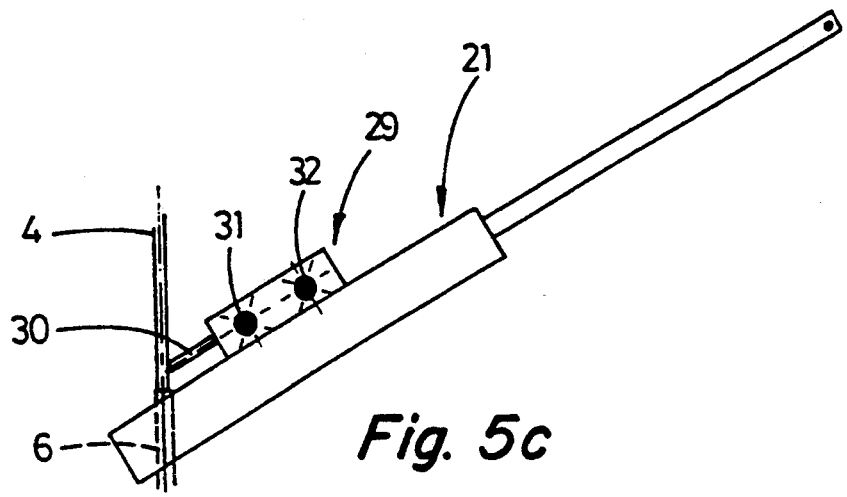

FIG. 5a, 5b and 5c show one of the nipple keys 21 having means for adjusting the nipple key 21 square to the spoke 4. This means includes a measuring device 29 having a feeler gauge 30 and two sensors 31 and 32 with which deviations in the squareness between the nipple key 21 and the respective spoke 4 can be determined. Said means further include an adjustment member 33 with which the nipple key may be rotated within a plane through the spoke 4. In the situation of FIG. 5a the nipple key 21 is out of square in relation to the spoke 4 to such an extent that both sensors 31 and 32 are inactive, while in the situation of FIG. 5c the nipple key 21 is out of square in opposite direction in which case both sensors 31 and 32 are activated. In both cases the control means 20 are activated such that the adjusting member 33 is adjusted in one direction or the other to rotate the nipple key 21 until the situation of FIG. 5b is obtained, in which the sensor 31 is activated and the sensor 32 is not. In that case the nipple key is square to the spoke 4.

A further adjusting member 34 of the nipple key 21 ensures that the nipple key 21 can be slid onto a nipple 6 parallel to the respective spoke 4.

FIG. 1 further shows sensors 35 with which the distance between two adjacent spokes 4 can be measured when the spoke wheel 1 is rotated. By means of the measured diameter it is also possible to calculate the number of spokes 4 within the wheel. With that it is also known when the wheel has made a full rotation.

Figure 6:
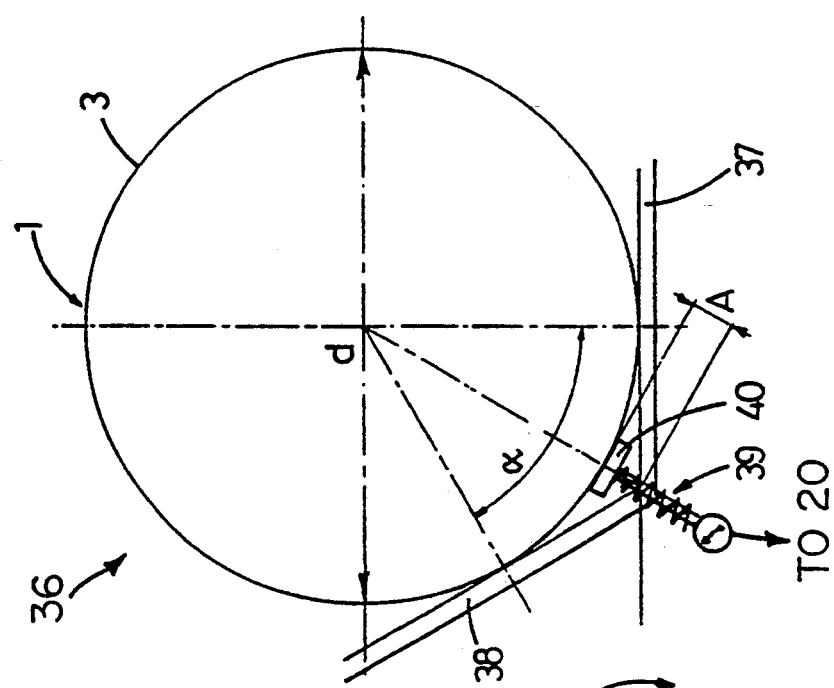
FIG. 6 shows means to determine the diameter of a spoke wheel.

FIG. 6 shows a measuring device 36 for determining the diameter of the rim 3 of each spoke wheel 1, which measuring device 36 is arranged at the entry of the apparatus. On the basis of the diameter measurement the hub support 7 may be adjusted to the diameter in vertical direction. The measuring device 36 consists of two V-shaped gutters 37 and 38 to which the rim 3 of an entering spoke wheel 1 comes to rest. In the middle of the angle between the V-shaped gutters 37 and 38 is arranged a displacement meter 39 engaging the rim 3 of the spoke wheel 1 by means of a similar V-shaped gutter 40 and measuring a distance A. When the value of angle $\alpha$ is chosen to be 67,114622° the measured value A equals 1/10 of the diameter d of the rim 3, so that from the measurement of the value A the diameter D of the rim 3 can be determined.

From the foregoing it will be clear that the apparatus according to the invention enables a quick and accurate straightening operation on the rim 3 of a spoke wheel 1.

The invention is not restricted to the embodiment shown in the drawing, which can be varied in different manners within the scope of the invention.

I claim:

1. An apparatus for straightening a rim of a spoke wheel having a hub, a rim, and spokes connecting the hub and rim by at least one of tensioning and releasing various spokes of the spoke wheel, said apparatus comprising:
    a hub support for supporting the hub of the spoke wheel,
    drive means for rotating the spoke wheel about its axis,
    at least one nipple key for rotating nipples to tension the spokes between the hub and the rim,
    a drive for said at least one nipple key,
    measuring means for measuring at least one of a radial and axial misalignment of the rim, said measuring means providing an indicative signal of he measurements, and
    control means for controlling the drive means for rotating the spoke wheel and the drive for the at least one nipple key in response to the indicative signal,
    wherein the drive for the at least one nipple key comprises means for limiting the maximum tension in the spokes and means for automatically increasing the maximum value of the spoke tension to be limited by the means for limiting, said means for automatically increasing being operated in a stepwise manner until the spoke wheel is tensioned to within predetermined radial and axial misalignment and wherein the means for limiting is an adjustable slip coupling.

2. Apparatus according to claim 1 further comprising means for operating the drive means so as to rotate the spoke wheel about its axis for at least one revolution, the drive for said at least one nipple key driving the at least one nipple key to rotate each nipple in the wheel, as the wheel is rotated, to a tension value between a predetermined minimum and maximum tension value.

3. Apparatus according to claim 2, wherein the means for operating further includes means for rotating the spoke wheel about its axis through at least one additional revolution thereof, the drive for said at least one nipple key driving the at least one nipple key to rotate at least some of the nipples, the drive for the at least on nipple key being responsive to the measuring means to tension the spokes at tension value between said predetermined minimum and maximum tension value.

4. Apparatus according to claim 3 wherein the means for automatically increasing the maximum value operates to increase the maximum value at the beginning of each of the revolutions of the spoke wheel.

5. Apparatus according to claim 1, comprising input facilities for input of the wheel geometry into a control program of the control means.

6. Apparatus according to claim 5, comprising a measuring device for determining the diameter of the spoke wheel.

7. Apparatus according to claims 5 or 6, comprising at least one sensor to determine the spoke spacing and the number of spokes within the spoke wheel, said at least one sensor providing a signal indicative of the spoke spacing and number of spokes to the control means.

8. Apparatus according to claim 1, further comprising a second nipple key having a corresponding drive and a corresponding means for limiting the tension in the respective spokes.

* * * * *